(12) United States Patent
Reutter

(10) Patent No.: US 6,349,842 B1
(45) Date of Patent: *Feb. 26, 2002

(54) COVER FASTENABLE ON A CONTAINER CONNECTION

(76) Inventor: Heinrich Reutter, Theodor-Heuss-Strasse 12, D-71336 Waiblingen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/147,380
(22) PCT Filed: Nov. 8, 1996
(86) PCT No.: PCT/EP96/04898
§ 371 Date: Apr. 5, 1999
§ 102(e) Date: Apr. 5, 1999
(87) PCT Pub. No.: WO97/48616
PCT Pub. Date: Dec. 24, 1997

(30) Foreign Application Priority Data

Jun. 19, 1996 (DE) ...................................... 296 10 724 U

(51) Int. Cl.[7] ............................................... B65D 55/00
(52) U.S. Cl. ...................... 220/201; 220/86.2; 220/89.1; 220/303; 220/304; 220/360; 220/367.1; 220/201; 220/203.01; 220/203.09; 220/203.1; 220/203.11; 220/203.22; 220/203.27; 220/203.29
(58) Field of Search ................................ 220/201, 202, 220/203.01, 203.19, 203.22, 203.23, 203.24, 203.26, 203.27, 203.28, 288, 303, 304, 86.2, 89.1, 562, 203.09, 203.1, 203.29, 212, 255, 256, 367.1, 360, 86.1, 203.11

(56) References Cited

U.S. PATENT DOCUMENTS

| | | | | | |
|---|---|---|---|---|---|
| 2,125,419 A | * | 8/1938 | Birk | ............................. | 220/201 |
| 2,528,372 A | * | 10/1950 | Kellogg | ........................ | 220/201 |
| 3,559,839 A | * | 2/1971 | Seethaler | ..................... | 220/201 |
| 4,872,584 A | * | 10/1989 | Sakai | .......................... | 220/201 |
| 5,108,001 A | * | 4/1992 | Harris | .................... | 220/203.26 |
| 5,456,243 A | * | 10/1995 | Jones | .......................... | 126/197 |

* cited by examiner

Primary Examiner—Allan N. Shoap
Assistant Examiner—Robin A Hylton
(74) Attorney, Agent, or Firm—Jones, Tullar & Cooper, P.C.

(57) ABSTRACT

The present invention relates to a rotatable cover which can be screwed or plugged on and is to be fastened on a stationary connection of a motor vehicle radiator or compensator reservoir of cooling and heating systems. The cover has a screw or plug cap and/or swivel cap and a rotatable engagement part in which a valve in the form of a combined overpressure/underpressure unit is arranged concentrically. The valve has a sealing member which produces a sealing connection with the stationary connection when the cover is applied. When the cover is positioned on the stationary connection, it is possible to prevent by means of a temperature-related control member removal, such as unscrewing or twisting of the cover. The temperature-related control member or a coupling part actuated by means of the temperature-related control member can be moved substantially radially between a coupling position and a release position. Consequently, a cover is produced which cannot be removed in cooling systems in which the temperature is still excessive, but which can be removed only when the excessive temperature has fallen completely, the cover nevertheless having a space-saving structure.

10 Claims, 2 Drawing Sheets

COVER FASTENABLE ON A CONTAINER CONNECTION

FIELD OF THE INVENTION

The present invention relates to a closure cover to be fastened, preferably by screwing on or slipping on and twisting, onto a stationary connection, for instance of a motor vehicle radiator, a compensation vessel in cooling or heating systems, or the like.

BACKGROUND OF THE INVENTION

Such closure covers are known from German patent DE 44 22 292 A1. They are used for instance in motor vehicle cooling systems, either directly as a radiator cap or as a closure for the compensation vessel. The closure cover can either be screwed on by means of a thread or slipped on and twisted by means of a bayonet element. In motor vehicle cooling systems, there is a problem with respect to the closure cover, which is that as a rule, because of the high temperature in the cooling system, the pressure is also high.

Even if at the moment the engine is turned off the temperature in the cooling system is not overly high, still an increase in temperature and thus pressure can occur in the cooling system after engine shutoff from a certain residual heating effect. If the user then immediately removes the closure cover of the cooling system, he runs an acute risk of being burned. This risk exists particularly in screw-type closure covers, because on unscrewing the closure cover the user is not made to slow down the unscrewing in the final phase or even better to interrupt it in order to make a pressure equalization with the ambient air and above all to wait. When a closure cover is screwed onto the cooling system, it is true that a venting connection to the outside is opened, but venting for pressure equalization cannot happen as fast as the user can possibly unscrew the closure cover completely. The same is correspondingly true for the use of a cover with a bayonet closure.

SUMMARY OF THE INVENTION

It is an object of the present invention to provide a novel structural form, with which coupling in a manner fixed against rotation at normal temperature and uncoupling at excess temperature can be reached equally reliably as with the known closure cover, and which allows a novel design of the components that cooperate for coupling and uncoupling.

To attain this object, in a closure cover of the type defined at the outset, the closure cover, in the state in which it is put on the stationary connection, can be secured against removal, preferably by unscrewing or untwisting, by means of a temperature-dependent control element, and the temperature-dependent control element a coupling part, is movable substantially approximately radially between a coupling position and a release position.

By means of the provisions of the present invention, a closure cover is created which, whenever a critical high temperature still prevails in the cooling system (or in the heating system) it cannot be removed. Injuries from high temperature and the resultant overpressure in the stationary connection when the closure cover is opened are thus prevented in every case. The temperature-dependent control element is accommodated in a space-saving way together with the coupling element.

In accordance with one exemplary embodiment, it is possible for the temperature-dependent element to be provided between the cap and the valve, and the cap and the connection, so that the cap is locked in a manner fixed against relative rotation relative to the stationary connection.

A preferred embodiment of the present invention is realized in accordance with the fact that the engagement part is held rotatably relative to the cap, and that with the said of the temperature-dependent control element, a coupling, in a manner fixed against relative rotation, between the cap and the engagement part, is attainable at normal temperature, and a decoupling between them is attainable at excess temperature. As a result, in the event of an overtemperature, the cap turns uselessly relative to the engagement part, so that it is not possible, even by force, to release the closure cover from the stationary connection.

Japanese patent, JP 62159721 discloses a twist-off prevention means with radially movable components. This closure cover, however, is not of the same generic type as that of the present invention since it has no engagement part that is rotatable relative to the cap. The same is true of German patent, DE 38 28 462 A1.

Further details of the present invention can be learned from the ensuing description, in which the present invention is described and explained in further detail in terms of the exemplary embodiments shown in the drawing.

DESCRIPTION OF THE PREFERRED EMBODIMENTS

Figure 1:
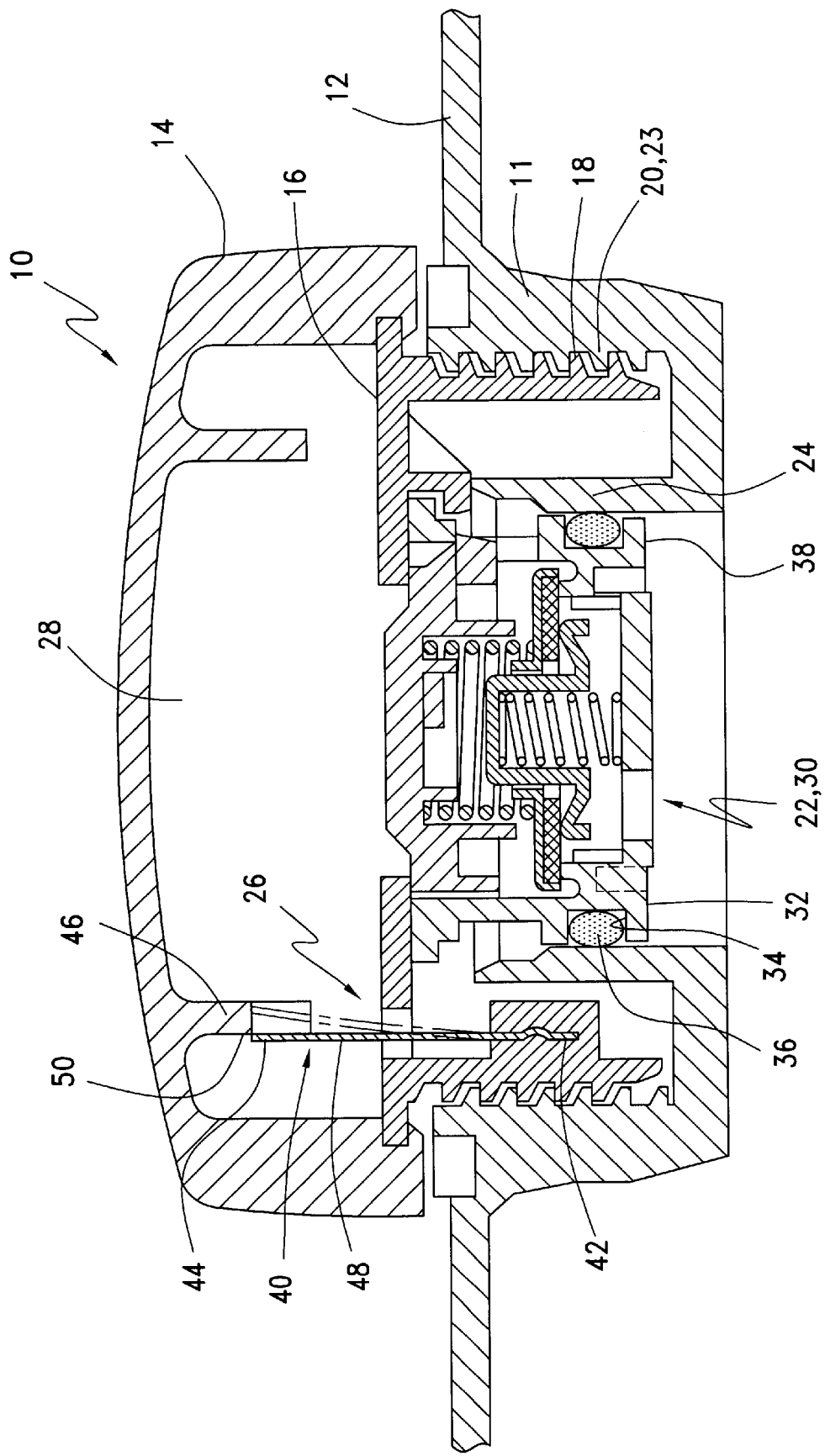
FIG. 1 is a cross section through a closure cover, in accordance with an exemplary embodiment of the present invention, screwed onto a stationary connection of a container, with a temperature-dependent twist-off prevention means according to the present invention, and FIG. 2. is a cross-sectional view, corresponding to FIG. 1, of a further embodiment of the closure cover of the present invention.

The closure cover 10 shown in the drawing is screwed onto a stationary connection 11 of a compensation vessel 12, c-20 shown in only fragmentary form, of a motor vehicle cooling system. The closure cover 10 includes a screw-type cap 14, an engagement part 16 that has a male thread 18 with which the closure cover 10 can be screwed into a female thread 20 of the connection 11, and a valve 22. In the instance shown, the connection 11 of the compensation vessel 12 has two concentric parts, namely on the outside a female thread part 23 carrying the female thread 20, and an inner neck region 24, which is engaged on the inside by the valve 22 of the closure cover 10. It is understood that it is also possible to provide the closure cover 10 with a female thread and/or to embody it in such a way that it can be screwed directly on to the stationary connection of a motor vehicle radiator.

The closure cover 10 of the present invention has a temperature-dependent twist-off prevention means 26, which assures that the closure cover 10 cannot be released or unscrewed from the stationary connection 11 until the compensation vessel 12, vehicle radiator, or the like, has dropped to normal or ambient temperature.

The cap 14 of the closure cover 10 forms a cup-shaped void 28, which opens in caplike fashion toward the bottom when the closure cover 10 is disposed on a horizontal opening. The void 28 is closed by the engagement part 16, which is held on the cap 14 such that it can be rotated in the circumferential direction relative to the cap 14 but is immovable in the axial direction. The component called the engagement part 16 can, in another embodiment, be embodied to fit over a protruding housing connection and may correspondingly have a female thread, and thus the term engagement part must not be understood in a limiting way.

Inside the engagement part 16, a valve housing 30 of the valve 22 is rotatable relative to the cap 14 and is held substantially immovably in the axial direction. The valve 22 is embodied in a manner known per se as a combined overpressure/underpressure valve, which opens if an excessive overpressure or underpressure occurs while the closure cover 10 is screwed onto the stationary neck 11 and thus protects the cooling system. The valve housing 30, on a front portion 32, is provided with an annular groove 34, in which an 0 ring 36 is laid that rests sealingly, when the closure cover 10 is screwed on, on the smooth inside face 38 of the neck 24 of the compensation vessel 12.

The twist-off prevention means 26 includes a temperature-dependent control element 40, which extends substantially axially and is retained on its lower end 42 on the engagement part 16. The control element 40 can be deflected essentially radially. In the region of its upper end 44, it cooperates with a concentric wall region 46, defining a coupling part of the cap 14 that protrudes from above into the void 28 from the inner wall of the cap. The wall region defines teeth 50 in which one end of the control element 40 engages. The control element 40, in a coupling position, is connected in a manner fixed against relative rotation to the concentric wall region 46 in one of the teeth 50 and thus to the screw-type cap 14. Deflection of the control element 40 substantially radially puts the control element into a release position relative to the cap 14, so that the cap 14 is rotatable relative to the engagement part 16, with the consequence that the closure cover 10 cannot be unscrewed from the connection 11; at overtemperature, it turns uselessly.

The control element 40 may preferably be a bimetallic strip 48. The control element 40 or bimetallic strip could also be joined to a coupling part, not shown in the drawing, such as a pin or the like that then cooperates in a coupling or noncoupling fashion with the cap 14 (or, in other embodiments, with the connection, the valve, or the engagement part).

In the region of its upper end 44, the control element 40 can cooperate by means of a toothed ratchet connection 50 with the concentric wall region 46, so that the control element 40 in its release position, can slide past the toothed outer face of the concentric wall region 46, which means that a rotary motion of the screw-type cap 14 cannot be transmitted to the engagement part 16, and therefore the closure cover 10 cannot be unscrewed from the connection 11.

The control element 40 is shown in FIG. 1 as a bimetallic strip 48 in its two positions. In the coupling position, represented by dashed lines, at the normal temperature of the control element 40, a connection fixed against relative rotation is made between the cap 14 and the engagement part 16, and the screw-type lid 10 can therefore be unscrewed from the container connection 11. If an excess temperature prevails in the interior of the compensation vessel 12, then the bimetallic strip 48 is deflected radially outward and brought into its release position shown, on the left in the drawing, in which a rotation of the cap 14 is not transmitted to the insert part 16 and thus the cap 14 turns uselessly, and the closure cover 10 can accordingly not be unscrewed.

Instead of using the bimetallic strip 48, a memory spring could also be used, which cooperates with a radially movable and in particular pinlike coupling part in such a manner that the coupling part, upon a corresponding change in the memory spring, can be shifted radially into a coupling position or into a release position.

Figure 2:
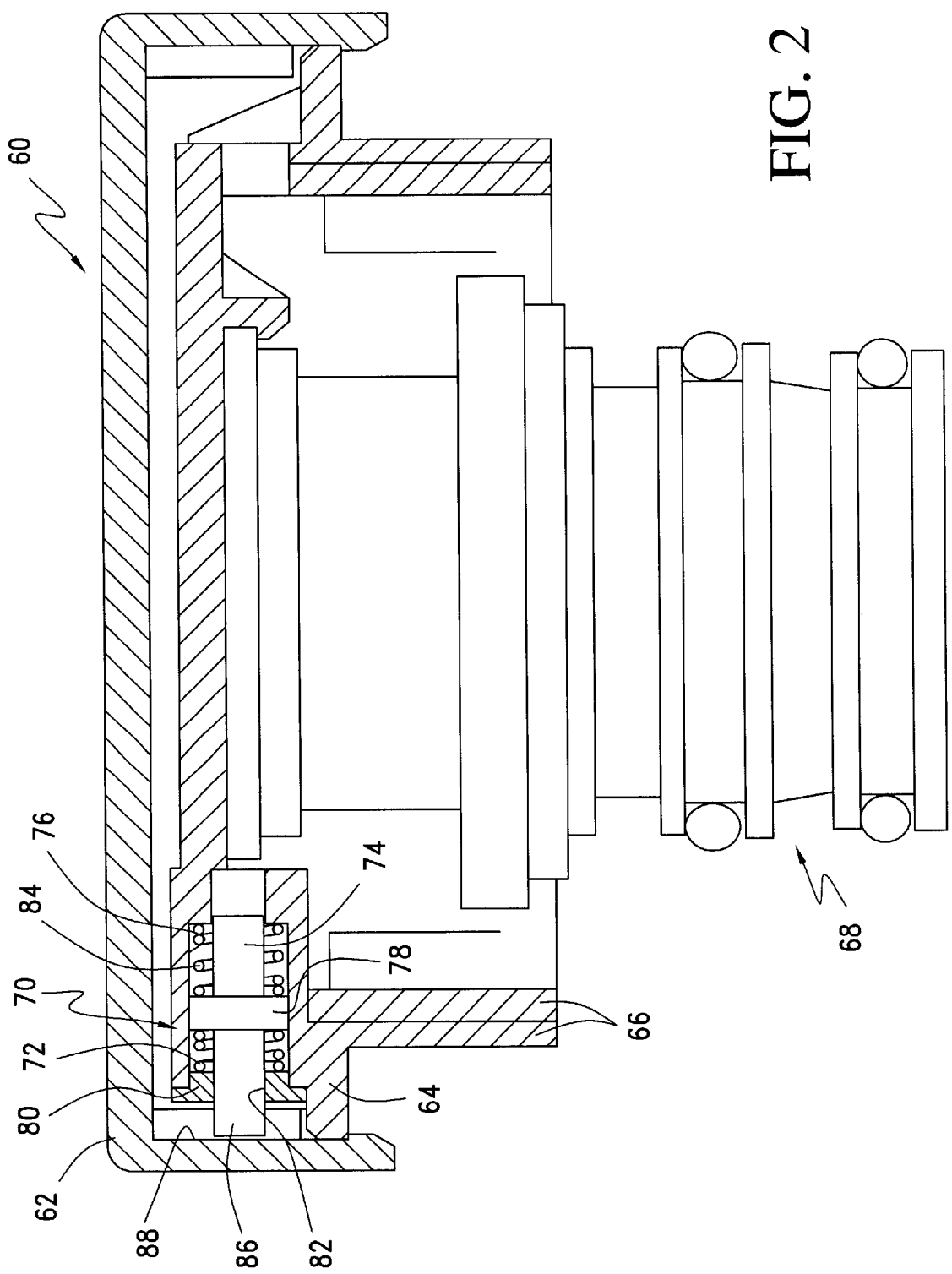

FIG. 2 shows one embodiment of a closure cover 60 that can be screwed to a connection, not shown. The closure cover 60 includes a screw-type cap 62 and an engagement part 64, which is either fixed against relative rotation or is rotatable relative to the screw-type cap 62, and which has a flangelike threaded portion 66 with which the closure cover 60 can be screwed to a threaded connection. As in the exemplary embodiment of FIG. 1, a centrally disposed valve unit 68 is disposed inside the engagement part 64; this valve unit is extensively equivalent to the valve unit 22 described in conjunction with FIG. 1 and therefore requires no further explanation here.

The engagement part 64 includes a temperature-dependent control element 70, including a memory spring 72. The memory spring 72 is disposed on a radially displacable, pinlike coupling part 74 and is received with it in a radially offset bore 76 in the engagement wart 64. It is supported on one end on an annular collar 78 of the pinlike coupling part 74 and on the other end on a radial closure part 80, which closes off the offset bore 76 from the outside and has a radial opening 82 that is penetrated by the pinlike coupling part 74. On the other side of the annular collar 78, a further spring 84 is provided on the pinlike coupling part 74. It is braced on one end against the annular collar 78 and on the other against the radially inner collar of the offset bore 76. The spring 84 thus exerts prestressing on the pinlike coupling element 74 and seeks to urge it radially outward, counter to the spring force of the memory spring 72. The radially outer end 86 of the pinlike coupling part 74 is moved, at normal temperature of the memory spring 72 and spring 84, into the coupling position shown in FIG. 2. In this position, the end 86 engages a detent bore 88 in the screw-type cap 62 and thus assures a coupling, in a manner fixed against relative rotation, between the screw-type cap 62 and the engagement part 64, so that the closure cover 60 can be screwed on and unscrewed. In the event of excess temperature, the memory spring 72 stretches, and the pinlike coupling part 74 is urged radially inward, so that the end 86 comes free of the detent bore 88 and the screw-type cap 62 turns uselessly relative to the engagement part. Unscrewing of the closure cover 60 is then impossible.

It should also be noted at this point that embodiments are conceivable in which the component designated as an engagement insert part is disposed in a manner fixed against relative rotation with respect to the cap 14, 62; in that case, the temperature-dependent twist-off prevention means is embodied such that when a certain excess temperature is reached, the cap 14, 62 is locked in a manner fixed against relative rotation with respect to the container or the container connection.

What is claimed is:

1. A closure cover for fastening on a stationary connection of a compensating vessel of a cooling or heating system, comprising:

a cap which can be connected to the stationary connection according to one of: being screwed on, being insertably slipped on, and being twisting on the stationary connection;

a rotatable engagement part connected to said cap;

an overpressure/underpressure valve arranged concentrically with said cap and said rotatable engagement part, said valve having a sealing element which sealingly engages the stationary connection when said cap is connected to the stationary connection; and a temperature-dependent control element mounted to said rotatable engagement part, said control element being movable substantially approximately radially relative to said cap between a coupling position and a release position, in said release position said control element preventing removal of said cap from the stationary connection by one of screwing, slipping and twisting, and in the latter position said control element permitting removal of said cap from the stationary connection by one of: screwing, slipping and twisting.

2. The closure cover as defined in claim 1, wherein said cap includes a coupling part which is engaged by said control element at said coupling position.

3. The closure cover as defined in claim 1, wherein said control element when in said coupling position prevents relative rotation of said cap and said valve when a normal temperature exists in the compensating vessel, and when an excess temperature exists in the compensating vessel said control element reaches said release position thereby permitting relative rotation of said cap and said valve so that the closure cover cannot be removed from the stationary connection.

4. The closure cover as defined in claim 1, wherein said control element when in said coupling position prevents relative rotation of said cap and said engagement part when a normal temperature exists in the compensating vessel, and when an excess temperature exists in the compensating vessel said control element reaches said release position thereby permitting relative rotation of said cap and said engagement part so that the closure cover cannot be removed from the stationary connection.

5. The closure cover as defined in claim 1, wherein said engagement part forms one piece with said cap, and wherein at an excess temperature in the compensating vessel said control element reaches said release position thereby permitting relative rotation of said engagement part relative to the stationary connection.

6. The closure cover as defined in claim 1, wherein said control element is formed by a bimetallic strip.

7. The closure cover as defined in claim 1, wherein said control element is formed by a memory spring.

8. The closure cover as defined in claim 1, wherein said control element includes a coupling part which is one of: a striplike, a platelike, and a pinlike coupling part, said coupling part being retained fixed against rotation in the circumferential direction of said cover, and movable or deflectable in the radial direction, and wherein said coupling part being movable between a coupling position and a release position with said control element.

9. The closure cover as defined in claim 1, wherein said cap defines a counterpart face forming a coupling part, and wherein said control element is formed by a bimetallic strip, one end of which is fastened to said engagement part, and the other end of which is radially deflectable and cooperates with said counterpart face on said cap.

10. The closure cover as defined in claim 2, wherein said coupling part includes teeth for effecting the rotationally fixed coupling of said cap and said engagement part and said cap and said valve.

* * * * *